Patented Dec. 24, 1929

1,740,994

UNITED STATES PATENT OFFICE

JOHN McGAVACK, OF JACKSON HEIGHTS, NEW YORK, ASSIGNOR TO GENERAL RUBBER COMPANY, OF NEW YORK, N. Y., A CORPORATION OF NEW JERSEY

METHOD OF TREATING RUBBER LATEX

No Drawing.   Application filed August 6, 1927.   Serial No. 211,264.

It has been proposed to evaporate water from rubber latex as a method of preparing a raw rubber having unusual strength and other desirable properties. Such rubber has been designated as "whole rubber" or sprayed rubber and contains all the non-rubber solid materials normally present in the rubber latex. While such whole rubber or sprayed rubber finds a widespread application in the manufacture of rubber goods, there are certain instances where it is desirable to employ a crude rubber containing a lesser percentage of the non-rubber solids, but retaining the other desirable properties characteristic of sprayed rubber.

The present invention is concerned with a method of treating latex, whereby non-rubber material can be separated from the latex and the rubber-containing portion of the latex may be further processed to yield a product having many properties in common with sprayed or whole rubbers.

Accordingly, one object of the invention is to provide an improved method for removing non-rubber solid material from latex. Another object is to provide a process for preparing a crude rubber from latex which has been treated to free it from non-rubber salt constituents without causing coagulation. A further object is to provide a method for manufacturing from latex a raw rubber having enhanced physical properties in comparison with rubber prepared by coagulation methods. A still further object is to prepare a raw rubber containing only a small percentage of the non-rubber soluble constituents ordinarily present in latex.

With the preferred method in mind but without intending to place limitations on the invention beyond what may be required by the prior art, the invention briefly stated consists in treating latex with a creaming agent comprising an alginic acid salt, allowing the treated latex to stand until separation into layers takes place, separating the layers, and manufacturing the rubber containing layer into crude rubber. The invention may also be described as consisting in treating the latex with a salt of alginic acid, allowing the latex to separate into layers, and converting the rubber layer into crude rubber by dehydration methods.

To illustrate one embodiment of the invention, ordinary rubber latex, preferably containing a small percentage of ammonia to prevent premature coagulation, is treated with a small amount of ammonium alginate in solution, to the extent of 0.2 parts of solid alginate to 100 parts of rubber in the form of latex. The alginate may be conveniently added as a 5% solution and thoroughly stirred into latex. After standing for some time, a sharp separation into layers occurs. In about twenty-four hours it will be observed that the upper layer contains practically all of the rubber in uncoagulated form, while the lower layer consists of an aqueous or serum portion which is substantially rubber free, and contains the greater portion of the soluble non-rubber constituents ordinarily present in latex. The upper portion, which contains the rubber, shows a considerable amount of concentration. The two layers may be separated in any suitable manner, such as siphoning off the lower layer or by decanting the upper layer. The rubber containing layer or "cream" is then converted into crude rubber preferably by spray drying in any suitable apparatus. The rubber cream may also be converted into rubber by the use of drum drying methods or by other suitable methods.

It has been discovered that the use of salts of alginic acid constitutes a rapid and extremely efficient method of bringing about the separation of rubber latex into a rubber-rich portion and a rubber-free portion. It has further been discovered that this sharp separation can be obtained by the use of very small amounts of the alginate and at the same time the concentration of the rubber in the "cream" is high. Further, the rubber cream is quite fluid and well suited to the use of spray drying apparatus as a means of manufacturing it into crude rubber.

To illustrate the concentration of rubber in the upper layer obtained by the use of varying amounts of alginate, reference is made to the following table in which the first column indicates the number of parts of alginate per 100 parts of rubber in the form of normal latex, the second column indicates the percentage of solids in the serum, and the third column, the concentration of rubber in the upper layer:

| Parts of alginate | Solids in serum | Percentage of rubber in cream |
|---|---|---|
| .8 | 4.5 | 33 |
| .7 | 4.7 | 35 |
| .5 | 4.9 | 48 |
| .4 | 5.1 | 52 |
| .3 | 5.5 | 55 |
| .2 | 6.5 | 57.5 |
| .15 | 7.0 | 58 |
| .1 | 9.0 | 58.5 |

The above values are those obtained at the end of twenty-four hours. Upon further standing, the concentration of rubber in the upper layer can be further increased, but without any substantial increase in the consistency of the layer.

When the invention is applied to fresh latex, it is desirable to add a small amount of ammonia as a preservative, this amount being, say, one-fourth of 1%. The invention may also be applied to latices which have been stabilized on the acid side of neutrality, although in this instance the rate of separation into layers is not quite as rapid. It has further been discovered that the latex may be subjected to repeated treatments with the alginate, but it has been found that after the fourth creaming operation, the lower layer is almost entirely water and contains but very little solid material. Instead of ammonium alginate, other soluble alginates may be employed. Much better results are obtained with the pure alginate than with impure alginate materials, but it is comparatively easy to obtain salts of quite high purity in the form of solutions.

One of the advantages derived from the use of the alginate salts as creaming agent is that the cost of treatment is considerably reduced owing to the fact that only very small amounts of materials are required. Rubber prepared by spraying the alginate-treated latex has a slightly lower specific gravity (.92) than whole or sprayed rubber (.94). Another advantage is that the rubber prepared from the treated latex has a lesser water absorption than pale crepe. The chemical properties of the improved rubber approach more nearly those of pale crepe and smoked sheet, but the physical strength of the rubber exceeds that of crepe or sheet and approaches more nearly that of sprayed rubber. The improved rubber shows a resistance to aging comparable with that of sprayed rubber and better than that of either crepe or sheet.

Uncoagulated rubber latex feed of soluble nonrubber constituents according to this invention may be utilized directly in the manufacture of rubber articles in any manner to which it is adaptable—for instance, by deposition, coating and/or dipping methods—and in its broadest aspects the invention comprehends such use of the uncoagulated material.

Having now described my invention, what I claim and desire to protect by Letters Patent is:

1. A method of treating rubber latex which consists in adding an alginate to divide it into a supernatant layer containing the rubber particles and a subnatant layer containing aqueous and soluble non-rubber constituents, and recovering the supernatant layer.

2. Uncoagulated rubber latex containing an alginate and substantially freed of soluble non-rubber constituents.

3. A method of treating rubber latex which comprises adding to latex an alginate, permitting the latex to stand until separation into uncoagulated rubber-rich and rubber-free portions occur, and manufacturing the rubber-rich portion into crude rubber.

4. A method of treating rubber latex which comprises adding a solution of an alginate to latex, allowing the latex to stand until the rubber separates in an uncoagulated layer, and spray-drying the rubber layer.

5. A method of treating rubber latex which comprises adding a small amount of ammonium alginate in solution to latex, allowing the latex to stand until the rubber has collected in an uncoagulated portion over a rubber-free aqueous portion which contains most of the soluble non-rubber constituents of the latex, separating the two portions and spray drying the rubber containing portion.

Signed at New York, county and State of New York, this 5th day of August, 1927.

JOHN McGAVACK.